Dec. 1, 1953  D. C. PETERS  2,661,005
CHAFFER ATTACHMENT
Filed March 24, 1950  2 Sheets—Sheet 2
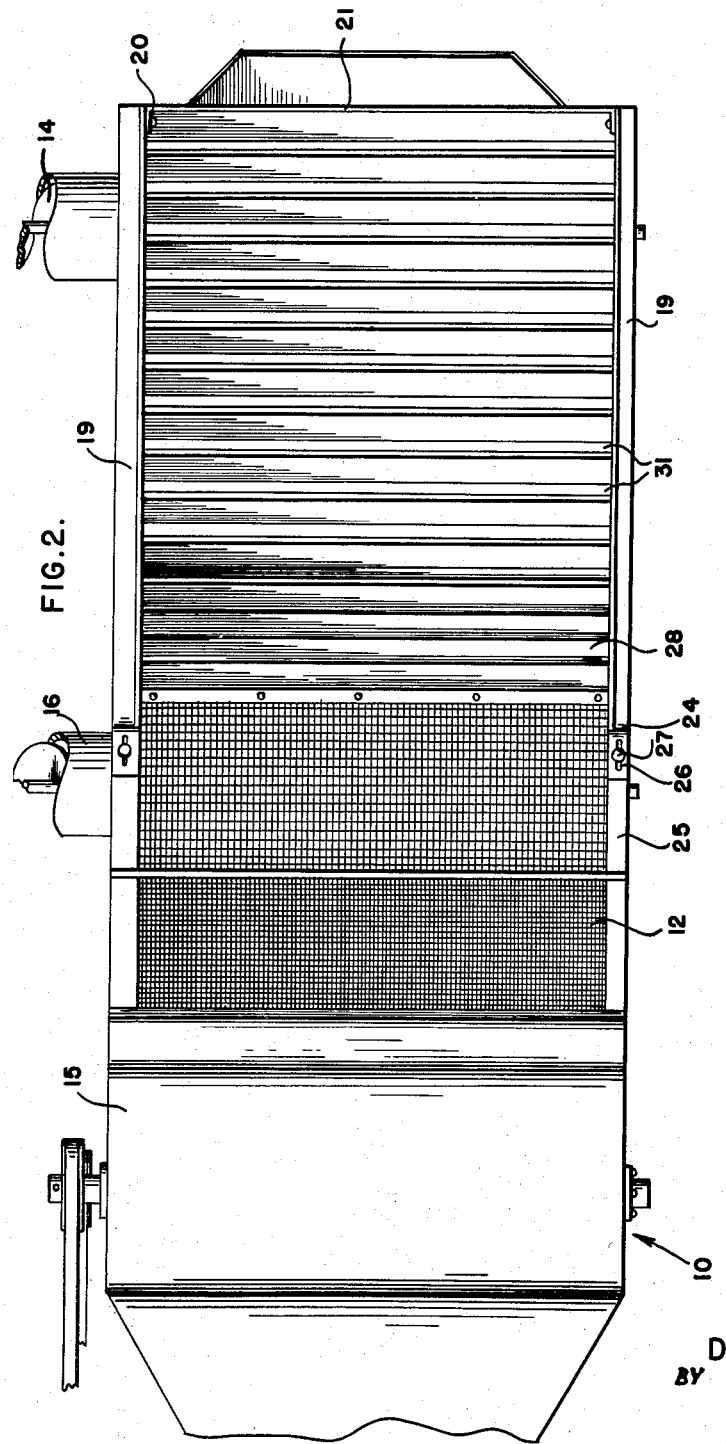
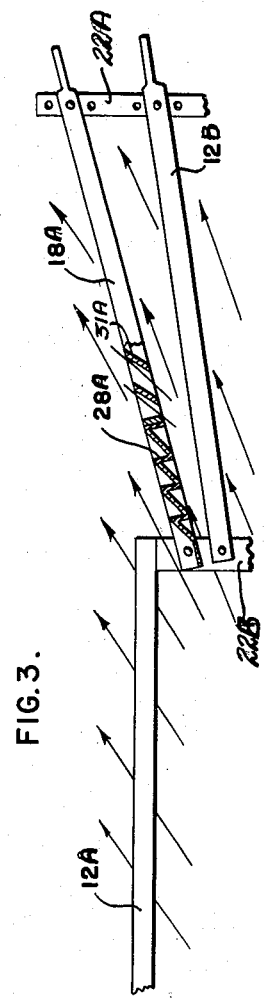
INVENTOR.
DONALD C. PETERS
BY Patented Dec. 1, 1953

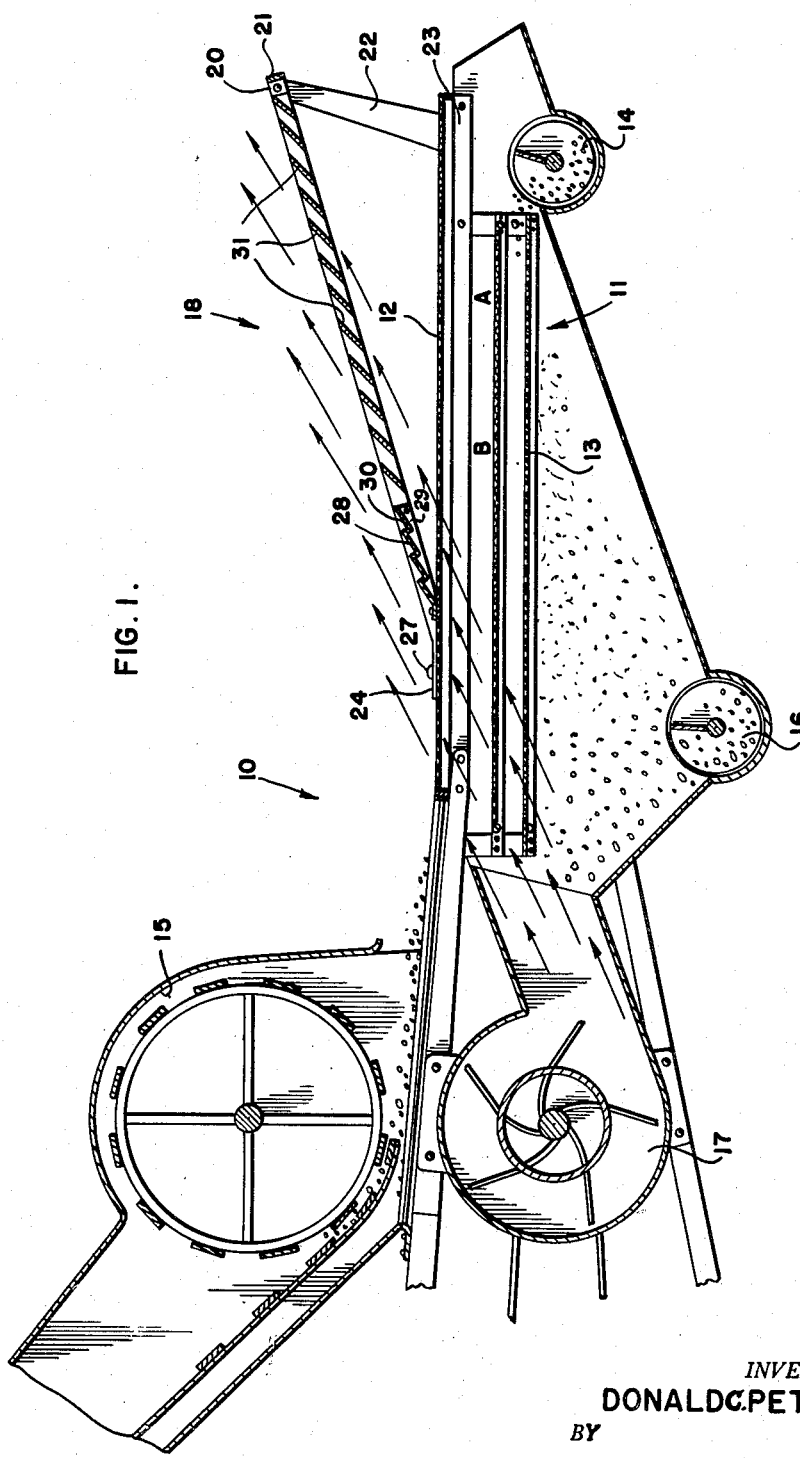

2,661,005

UNITED STATES PATENT OFFICE 2,661,005

CHAFFER ATTACHMENT

Donald C. Peters, Paola, Kans.

Application March 24, 1950, Serial No. 151,689

8 Claims. (Cl. 130—24)

My present invention relates generally to combines and more specifically has reference to means for installation in all types of combines for relieving or materially lessening the load on the chaffer and tailing sieve members whereby the grain may more readily and easily find its way into the grain tank rather than be deposited into the return line or conduit for the tailings.

Viewing the invention broadly, it comprises supporting a foraminous member on the chaffer at substantially the mid-point of the chaffer, the foraminous member extending upwardly from the chaffer at an angle thereto and provided with a solid ramp portion adjacent the juncture of the respective members whereby the load entering the chaffer from the cylinder will be moved upwardly away from the chaffer thereby clearly providing a relatively large area of the chaffer rearwardly of the foraminous member that is free of any load to permit the grain to pass through the chaffer and sieve into the grain tank and at the same time reduce the load on the rear portion of the chaffer thus increasing its efficiency.

An object of the invention is to provide a foraminous member to aid in the distribution of the load entering the cleaning shoe of a combine to effect a better separation of the grain from the tailings which consists of few essential structural members, which can be cheaply manufactured and which presents little, if any, maintenance problems.

Yet a further object of the present invention is to provide an attachment of the character described wherein the foraminous member is mounted on the chaffer element at an angle thereto, the angle preferably being between the range of 10 to 25 degrees to properly coordinate the member with the fan and to maintain the desired area of the chaffer rearwardly of the foraminous member substantially free of any load.

A still further object of my invention is to provide a member to assist in the more uniform distribution of the load and which member may be easily installed in conventional combines by unskilled workmen without altering or modifying materially the combine.

With the above and other advantageous objects in view, the invention consists in the details of construction, and in the arrangement and combination of parts to be hereinafter more fully set forth and claimed.

In describing the invention in more detail, reference will be had to the accompanying drawings forming part of this application wherein the same numerals indicate corresponding parts in the several views, and in which:

Figure 1 is a vertical sectional view of the invention, the combine being diagrammatically illustrated.

Figure 2 is a top plan view of the invention.

Figure 3 is a view in side elevation and partly in section of another type of construction referred to as a triple chaffer distributor assembly.

With reference to Figure 1, a combine of conventional type is indicated 10, 11 is the cleaning shoe, 12 is the chaffer, 13 is the tailings sieve, 14 is the endless screw or auger for moving the tailings back to the cylinder 15, 16 is the endless screw for conducting the grain to the bin (not shown), 17 is a fan for directing a blast of air through the cleaning shoe and 18 indicates generally my distributing member which is operatively connected to the chaffer 12 and which extends upwardly therefrom.

The member 18 includes a pair of spaced parallel longitudinally extending angle irons 19, the rear ends of which are detachably connected to inturned flanges 20 at opposite ends of a back rail 21 as depicted in Figure 2. To support the member above the chaffer, it will be noted that a pair of upstanding brackets 22 are suitably attached at their lower ends to side rails 23 of the chaffer while the upper ends are secured to the irons 19 by the fastenings which connect the back rail 21 to the angle irons. The front end of each of the irons 19 terminates in an angular extension 24 which is adapted to rest on the horizontal surface 25 of the chaffer side rails and each extension is formed with an elongated slot 26 and a suitable fastening 27 extends through the slot and an opening in the surface 25 to affix the front of the member to the chaffer.

The forward end of the distributing member 18 is secured to the chaffer at approximately the mid-point of the chaffer and the angle irons extend upwardly at an angle of from between 10 to 25 degrees with respect to the chaffer to thus provide a substantially clear zone on the chaffer rearwardly of the junction of the angle irons 19 to the side rails 23, as will later be more fully set forth.

A ramp 28 extends between the irons 19 rearwardly of the extensions 24 and each end of the ramp is downturned, as at 29, and bolts or the like attach the downturned ends to the vertical flange of each angle iron. The upper face or wall of the ramp is stepped or staggered, as indicated at 30, the purpose of which will hereinafter be more specifically described. The rear zone of member 18 includes a plurality of cross members or slats 31 fixed at their outer ends to the angle irons in parallel spaced relation and the slats are located at the desired intervals between the upper edge of the ramp and the back rail 21. Of course, the number and spacing of the slats will be dependent upon the specific combine to which the distributor is attached.

Referring to Figure 3, there is shown another form of chaffer arrangement which may be employed in lieu of the unit shown in Figure 1. This form includes an upper chaffer 12A suitably supported by the combine, the chaffer including a plurality of transversely extending slats such as shown at 31 in Figure 1. A lower chaffer 12B is supported at its rear end by upstanding brackets 22A, the lower ends of which are mounted on the combine. The forward end of the lower chaffer 12B is supported by uprights 22B on which the forward end of the upper chaffer 12A is mounted, and it can be seen that the forward end of the chaffer 12B is spaced below the forward end of the chaffer 12A in substantially the same plane. Overload chaffer 18A which is similar to the distributing member 18 of Figure 1 is likewise supported at its rear and forward ends by the brackets 22A and 22B, and the forward end of the distributing member 18A is located in the space between the front ends of the upper and lower chaffers 12A and 12B.

As indicated in the drawings, the shoe is so formed and dimensioned as to locate the air chute of fan 17 in such position that the air path extends through the advance end zone of the chaffer and forward of the advance end of ramp 28, the latter being located at a point spaced from and in rear of the chaffer advance end and forward of the mid-length of the chaffer, the air path being directed to discharge the air in a direction such as to not only pass through the chaffer in advance of the ramp but will have its air blasts moving in the general direction of length of member 18 and above such member. Hence, the threshed content advancing from the threshing zone is subject to the air blast conditions upon the content reaching the chaffer, the blasts thus not only providing a force made active on the lower side of the advancing content and partially opposing the weight of the content, thereby easing the advance of such content, but additionally providing a force which is being applied above member 18 in the general direction of length of such member, as indicated by the arrows in Fig. 1.

As a result, the straw content of the load which is retained above the chaffer and is required to advance over member 18 is being subjected to the continuous air blast effect produced by the fan operation; and since the air pressure is being exerted above the top plane of member 18 and approximately parallel with such plane, the blasts are providing a direct aid to the movement of the straw content over the member, acting as a pushing force for moving the content upward over the top plane of the member, although such plane extends angularly upward relative to the top plane of the chaffer. The ability to do this is enhanced by the fact that the air path itself also extends beneath the ramp—and thus over both the upper and lower faces of the latter—and thus reaches the slatted zone of the member, enabling the air to pass through the spaces of this zone beneath the advancing straw content, thereby aiding the advance by providing a semi-air cushioning effect between the advancing straw content and the top of the member with consequent reduction of friction.

In operation, the load is picked up by the ramp 28 at the central point of the chaffer 12, the load passing up the ramp by virtue of the air directed upwardly through the shoe 11 by the fan 17. The ramp 28 will prevent the chaff from dropping on the chaffer 12 thereby clearing a substantial area of the chaffer rearwardly of the ramp and thus enable the grain to drop through the chaffer, the tailings sieve, the finishing screen and thence into endless screw 16. Furthermore, by the bulk of the straw load passing over the slats 31, the load on the chaffer rearwardly of the distributing member is materially lessened with the attendant result that the grain may find ready access into the screw throughout substantially the full length of the chaffer. Additionally, the member 18 by directing the main load as indicated will relieve the load on the tailings sieve 13 and the auger 14 whereby the cylinder 15 may operate more properly on the new grain entering the cylinder. Since the straw content load is being carried away from the chaffer over the top of member 18, the major portion of the chaffer—the portion in rear of the entrance to the ramp—is given greater freedom of inspection, making possible greater efficiency in operation since it is possible, by observing the chaffer activities, to adjust the angularity of the latter to produce the desired maximum output in grain content from the combine in service.

It should be mentioned that the angle of the distributing member should be such as to provide the required cleared area to the rear of the ramp and also to be correctly coordinated with the air emanating from the fan 17.

From the foregoing it will be fully appreciated that the present invention will greatly relieve the load on the chaffer and the tailings sieve and thereby insure a saving in grain by preventing its entry into the auger for the tailings. The unit is quite simple in constructional detail and can be manufactured at a relatively low cost. Also, the distribution can be easily and quickly installed on or removed from the combine without the necessity of employing skilled workmen or mechanics.

I claim:

1. In a combine having a cleaning shoe, a substantially horizontally disposed chaffer having an advance end and a rearward end located within the shoe, means to introduce the load onto the chaffer, a fan located below and forwardly of the advance end of the chaffer for directing air through the chaffer and means below the chaffer for receiving the separated grain, the improvement comprising a foraminous member having a forward end supported by and extending upwardly from and angular to the chaffer, the forward end of the foraminous member being spaced rearward of the advance end of the chaffer and forward of the mid-length point of such chaffer, whereby the load will be directed upwardly away from a substantially large area of the rearward end of the chaffer to permit the grain to readily fall through the chaffer into the grain receiving means, the fan and foraminous member being relatively positioned to present the air travel path as extending through the chaffer forward of the entrance to the foraminous member to thereby provide straw-load movement over such foraminous member by movements of air blasts of fan origin applied over and through the foraminous member.

2. A combine as claimed in claim 1 wherein the forward end of the foraminous member is disposed at an angle of from 10 to 25 degrees relative to the chaffer.

3. A combine as claimed in claim 1 wherein the foraminous member adjacent its forward end on the chaffer is provided with a non-foraminous ramp zone to prevent load content from falling on the chaffer until the load has passed a substantial distance beyond the ramp thereby maintaining a large area of the rear of the chaffer clear of straw load.

4. A combine as claimed in claim 3 wherein the upper face of the ramp is formed with transversely extending corrugations.

5. A combine as claimed in claim 1 wherein the foraminous member includes a pair of spaced parallel members, a rail connecting the rear ends of said members, brackets attached to the chaffer and the spaced members to support the rear ends of the members at an angle to the chaffer, a horizontal extension on the front end of each spaced member, means to secure each extension to the chaffer, and a plurality of spaced slats extending transversely of and attached to the spaced members.

6. A combine as claimed in claim 5, wherein a non-foraminous ramp extends transversely of and is secured to the spaced members adjacent to the horizontal extensions.

7. A combine as claimed in claim 6, wherein the transversely extending slats are located in spaced parallel relationship intermediate the non-foraminous ramp and the rail connecting the rear ends of the spaced members.

8. In a combine having a cleaning shoe, a substantially horizontal upper chaffer having a forward end and a rearward end supported therein, a lower chaffer having a forward end and a rearward end mounted within the shoe at a point below the upper chaffer with the forward ends of the respective chaffers being in the same plane, a foraminous member angularly supported within the cleaning shoe to extend upwardly at an angle to the plane of the lower chaffer and having its lower end disposed intermediate adjacent ends of the upper and lower chaffers, said member including a non-foraminous ramp at its lower end to prevent the load introduced onto the upper chaffer from falling upon the lower chaffer until the load has passed a substantial distance beyond the ramp of the foraminous member.

DONALD C. PETERS.

References Cited in the file of this patent

UNITED STATES PATENTS

| Number | Name | Date |
|---|---|---|
| 114,984 | Smith | May 16, 1871 |
| 990,804 | Clymans et al. | Apr. 25, 1911 |
| 1,021,917 | Cooper | Apr. 2, 1912 |
| 1,037,248 | Heinz | Sept. 3, 1912 |
| 1,112,848 | Seagren | Oct. 6, 1914 |
| 1,366,691 | Humke | Jan. 25, 1921 |
| 1,428,599 | Lunz | Sept. 12, 1922 |
| 2,186,210 | Scheel | Jan. 9, 1940 |
| 2,190,262 | Geist | Feb. 13, 1940 |
| 2,441,917 | Dion | May 18, 1948 |